US009371186B2

(12) United States Patent  (10) Patent No.: US 9,371,186 B2
Kiener et al.  (45) Date of Patent: Jun. 21, 2016

(54) FRICTION DRIVE FOR FORCE TRANSMISSION, IN PARTICULAR FOR A TRANSPORT CONVEYING DEVICE

(71) Applicant: Kiener Maschinenbau GmbH, Lauchheim (DE)

(72) Inventors: Waldemar Kiener, Lauchheim (DE); Paul Abele, Aalen-Fachsenfeld (DE)

(73) Assignee: Kiener Maschinenbau GmbH, Lauchheim (DE)

( * ) Notice: Subject to any disclaimer, the term of this patent is extended or adjusted under 35 U.S.C. 154(b) by 0 days.

(21) Appl. No.: 14/443,728

(22) PCT Filed: Nov. 13, 2013

(86) PCT No.: PCT/EP2013/073708
§ 371 (c)(1),
(2) Date: May 19, 2015

(87) PCT Pub. No.: WO2014/076124
PCT Pub. Date: May 22, 2014

(65) Prior Publication Data
US 2015/0298909 A1  Oct. 22, 2015

(30) Foreign Application Priority Data

Nov. 19, 2012  (DE) .................... 20 2012 104 459 U
Jul. 8, 2013  (DE) .................... 20 2013 102 994 U

(51) Int. Cl.
*B65G 13/06* (2006.01)
*F16D 7/02* (2006.01)
(Continued)

(52) U.S. Cl.
CPC .............. *B65G 13/073* (2013.01); *F16D 7/007* (2013.01); *F16D 15/00* (2013.01); *F16D 2300/06* (2013.01)

(58) Field of Classification Search
CPC .... B65G 13/073; B65G 13/071; F16D 7/021; F16D 2300/06; F16H 1/46; F16H 1/22
USPC ...................................................... 198/781.02
See application file for complete search history.

(56) References Cited

U.S. PATENT DOCUMENTS 3,567,010 A   3/1971  Vom Stein
3,616,894 A   11/1971  Koennecke et al.
(Continued)

FOREIGN PATENT DOCUMENTS

DE  71 23 224 U  9/1971
DE  32 22 177 A1  12/1983
(Continued)

OTHER PUBLICATIONS

International Search Report for corresponding Patent Application No. PCT/EP2013/073708 dated Jan. 29, 2014.

*Primary Examiner* — Mark A Deuble
(74) *Attorney, Agent, or Firm* — Renner, Otto, Boisselle & Sklar, LLP

(57) ABSTRACT

The invention relates to a friction drive for force transmission, in particular for a transport conveying device, comprising a drive element (31) and an output element (34) and comprising a torque-limiting device (33), which acts therebetween and transmits a drive torque introduced by said drive element (31) up to a transmission torque, which can be set by means of the torque-limiting device (33), to the output element (34), and allows free running when a drive torque exceeds the set transmission torque, and which comprises at least one rolling bearing (41) having an inner race (42) and an outer race (46) and rolling bodies (45) arranged therebetween, and a clamping device (51), by means of which the inner race and the outer race of the at least one rolling bearing (41) of the torque-limiting device (33) can be displaced towards each other in an axial direction or can be clamped against each other in a radial direction and a transmission torque can be set.

14 Claims, 6 Drawing Sheets

Figure 1:
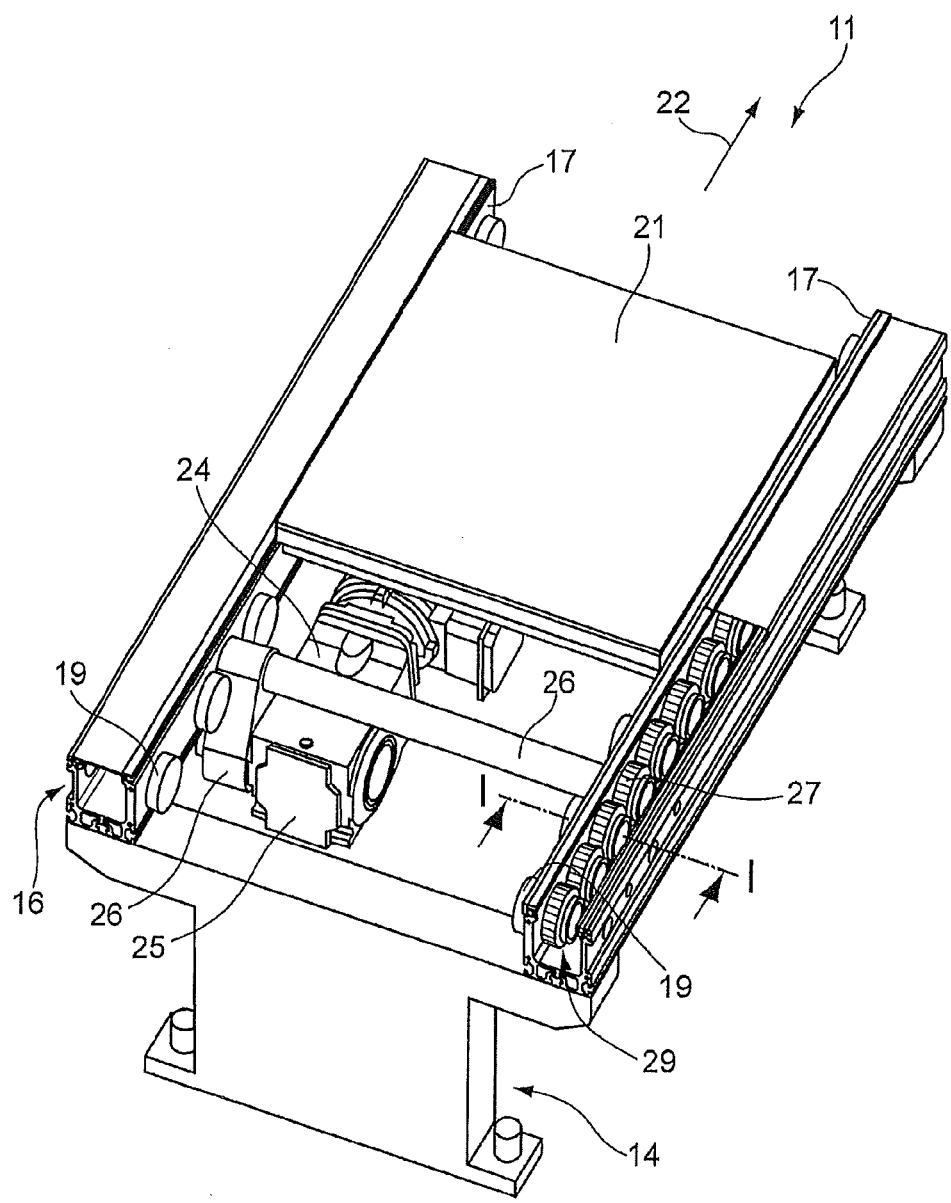

(51) Int. Cl.
*B65G 13/073* (2006.01)
*F16D 7/00* (2006.01)
*F16D 15/00* (2006.01)

(56) References Cited

U.S. PATENT DOCUMENTS

| | | | |
|---|---|---|---|
| 4,103,516 A | 8/1978 | Marcin | |
| 4,263,789 A | 4/1981 | Koepke et al. | |
| 4,993,541 A | 2/1991 | Roh | |
| 5,076,420 A * | 12/1991 | Kuschel | B65G 47/261 |
| | | | 198/781.08 |
| 5,147,024 A * | 9/1992 | Yamada | B65G 47/261 |
| | | | 198/781.02 |
| 7,992,705 B2 * | 8/2011 | Shiga | B65G 13/04 |
| | | | 198/781.07 |
| 2005/0183933 A1 * | 8/2005 | Vogl | B65G 13/071 |
| | | | 198/791 |

FOREIGN PATENT DOCUMENTS

| | | |
|---|---|---|
| DE | 41 35 565 C2 | 5/1993 |
| DE | 689 08 395 T2 | 4/1994 |
| DE | 42 38 296 A1 | 5/1994 |
| EP | 1 418 138 A1 | 5/2004 |
| FR | 2 629 158 A1 | 9/1989 |
| WO | 89/07208 | 8/1989 |

\* cited by examiner

FRICTION DRIVE FOR FORCE TRANSMISSION, IN PARTICULAR FOR A TRANSPORT CONVEYING DEVICE

The invention relates to a friction drive for force transmission, in particular for a transport conveying device, by which a transmission torque from a drive element to an output element is able to be set.

Friction drives for force transmission can be used, for example in transport devices. In transport devices, workpiece carriers are transported from one processing station to the next processing station, for example by means of castors. The workpiece carriers are stopped in the processing position due to the upcoming processing steps in the processing stations. A drive torque is transmitted to a drive element via a drive of the transport conveying device, which transmits this drive torque to a drive element which receives, for example, a transport roller. Due to such a friction drive, both a further cycling of the workpiece carrier and an isolation between the drive element and the output element, in particular in a stop position of the workpiece carrier, can be achieved in a processing station.

The object of the invention is to propose a friction drive for force transmission which works in a virtually wear-free manner.

The present invention provides a friction drive for force transmission. The friction drive comprises a torque-limiting device acting between the drive element and the output element, which comprises at least one rolling bearing having an inner race and an outer race as well as rolling bodies arranged therebetween, and which, with a clamping device, displaces the inner race and the outer race of the at least one rolling bearing towards each other in the axial direction or clamps them against each other in the radial direction, whereby a maximum transmission torque is able to be set. A predetermined friction and thus a transmission torque can be able to be set using the axial displacement of the inner race towards the outer race of such a rolling bearing, with which a drive torque is able to be transmitted from the drive element to the output element. Provided a torque which exceeds the transmission torque which is able to be set acts on the output element, free running is activated by a moment-limiting device, i.e. the drive element can rotate freely with respect to the output element without damages occurring. Due to the use of the rolling bearing, for which the track of the inner race and the outer race and also the rolling bearing are hardened, a virtually wear-free torque-limiting device can be formed which additionally is optionally able to be set by means of the clamping device in a simple way to a predetermined transmission torque. Thus defined drive torques can be transmitted.

Preferably, at least one torsional isolation device is provided between the clamping device and the torque-limiting device. Thus the clamping device exerts forces which act exclusively in the axial direction on the inner or outer race of the at least one rolling bearing without an additional friction acting between the at least one rolling bearing of the torque-limiting device via the clamping device.

The torsional isolation device is preferably formed by a sliding or rolling bearing. In particular in the case of a rolling bearing, a high degree of friction reduction can be achieved. The torsional isolation device is preferably formed by at least one rolling bearing. Thus, a constructional conformity of the torque-limiting device and the torsional isolation device can be provided.

The clamping device acting on the torque-limiting device preferably comprises at least one spring element and one adjusting element, using which the clamping force is able to be set in the axial or radial direction on the inner or outer race of the rolling bearing of the torque-limiting device. This clamping device can be constructed in a constructively simple manner, wherein a proportioned application of the clamping force is enabled by the adjusting element.

The at least one spring element of the clamping device is preferably formed as a disk spring or a disk spring packet. Thus a compact arrangement having a high clamping force can be achieved. Alternatively, a pressure spiral spring element, a leaf spring element, a plastic-elastic element or similar can be used.

The clamping device is preferably arranged on or in an output element, in particular an output shaft, wherein the adjusting element engages with or in the output element and is able to be set axially, preferably in the direction of the longitudinal axis of the output element. Thus, a constructively space-saving arrangement as well as a simple construction can be provided. Depending on the accessibility, the one or other alternatives can be selected such that an accessibility from outside to a clamping device arranged in a housing or a profile is also possible.

The at least one rolling bearing of the torque-limiting device is arranged on the drive element to be fixed in terms of rotation to the inner race, and abuts on a shoulder on the drive element which counteracts the direction of the clamping force. Thus the at least one rolling bearing can be received with its inner race fixed in terms of position with regard to the drive element such that a clamping force acting in the axial direction displaces the outer race towards the inner race in order to apply an increased friction. For example, in the case of a drive element formed as a drive gear wheel, a lower axial displacement towards the output element can be unproblematic due to the gear mesh width, such that a simple setting of a transmission torque on the one hand, and an effective transmission of the drive torque via the drive element on the other hand, is provided.

A preferred embodiment of the friction drive provides a spacer element, in particular a spacer disk, between the outer race of the rolling bearing of the torque-limiting device and the rolling bearing of the torsional isolation device. In this embodiment, the clamping device preferably engages with the inner race of the rolling bearing of the torsional isolation device, wherein the axial force is transmitted to the outer race of the rolling bearing of the torque-limiting device via the outer race of the rolling bearing of the torsional isolation device. Due to the spacer disk, an axial displacement is also enabled between the inner race and the outer race of the rolling bearing of the torsional isolation device, such that this can likewise be used as a friction element, just as the rolling bearing of the torque-limiting device.

Furthermore, preferably the at least one rolling bearing of the torque-limiting device abuts on a shoulder of the drive element with its outer race, which is arranged on the drive element at a distance to the clamping device. Thus, in turn, a defined receiving positioning of the at least one rolling bearing with respect to the drive element can be provided.

The rolling bearing of the torque-limiting device and the rolling bearing of the torsional isolation device are preferably formed as contact ball bearings, as radially clamped ball bearings, as roller bearings or as tapered roller bearings, which are aligned adjacently to each other and mirrored with respect to each other. Thus the torsional isolation device can assume a double function: on the one hand torsional isolation, and on the other hand the function for a transmission torque which is able to be set analogously to the rolling bearing of the torque-limiting device. Thus high transmission torques are also able to be set in a small construction space.

The drive element is preferably formed as a drive shaft which has a receiving section, preferably for a castor or load-bearing roller. Thus, in a simple manner, a connection of different drive rollers for, for example, workpiece carriers or workpieces for transport by a conveying device to the output element can be provided in order to enable a plurality of applications.

The drive element is preferably formed as a drive gear wheel, which is driven by an intermediate gear wheel or a motor. This design enables, for example during use in a transport conveying device, several of such friction drives to be able to be arranged one behind the other, which are connected to be driven directly to the intermediate gear wheels and thus a simple and constructive construction is provided.

The friction device is preferably provided with further friction drives in a transport conveying device, using which workpiece carriers or workpieces are driven displaceably in the transport direction. These friction drives have the advantage that these are formed to be compact and are able to be integrated into the carrier profile in a simple manner. Additionally, several friction drives connected in series can simultaneously supply the drive of a workpiece carrier or workpiece via a drive.

Preferably, an annular gap is provided between the inner race of the rolling bearing of the torque-limiting device and a shaft section of the output element allocated to the inner race, at least two sealing elements which are arranged at a distance to each other being arranged in said annular gap. This arrangement has the advantage that the axial displaceability of the rolling bearing of the torsional isolation device is improved. This displaceability can itself then be maintained, should a change in the diameter of the inner race of the rolling bearing occur during application of a clamping force by the clamping device.

A further preferred embodiment provides that the at least one sealing element is arranged in a circumferential groove in the shaft section of the output element. Thus, a processing of the hardened inner race of the rolling bearing is not required. Preferably, the depth of the circumferential groove is provided in such a way that sealing elements used therein are raised slightly with respect to the outer periphery of the shaft section.

Furthermore, preferably in the annular gap limited between the sealing elements, a lubricant or corrosive medium is provided. Thus, on the one hand, the axial displaceability is improved, and on the other hand, a gap corrosion is prevented.

A further preferred embodiment of the invention provides a torque-limiting device and a torsional isolation device, which are formed by at least one mutual sliding or rolling bearing. Thus, an arrangement that is reduced in construction space is enabled. This embodiment is, in particular, provided during the application of a clamping force in the radial direction.

A preferred embodiment of the invention provides that the clamping device is formed by an outer and an inner clamping ring, between which the at least one sliding or rolling bearing of the torque-limiting device is positioned and a clamping element engages with the outer or inner clamping ring, which generates a clamping of the inner and outer clamping ring in the radial direction. Thus, an increased pressing force can also act on the sliding or rolling bearing arranged therebetween, whereby the friction force is able to be set for the transmission of torques.

Preferably, at least one expander cone or clamping cone is provided. Alternatively, the clamping element can also be formed with an interference fit. This enables a compact embodiment of a clamping element which can generate high clamping forces in the radial direction.

A further preferred embodiment of the invention provides that the friction drive has several torque-limiting devices aligned next to one another. These can, for example, be provided in the form of a planetary gear such that an addition of the friction torque is thereby enabled. Thus, a larger region for transmission of friction torques can also be controlled.

A further alternative and preferred embodiment of the invention provides that the clamping device comprises an adjusting element which is formed as an adjusting screw which is arranged in a borehole of the output element, and a pressure piece formed as a pressure sleeve having a drive pin which penetrates the borehole operates in the axial direction. A front-side operation of the clamping device is thus enabled. Provided the front side of the output element lies in a housing wall, a simple adjusting of the friction drive for force transmission from the outside can thereby be enabled.

Furthermore, preferably a pressure bolt is provided between the drive pin and the adjusting screw, said pressure bolt preferably having a sealing element and sealing the borehole to the pressure bolt. Thus, on the one hand an adjustment and operation of the clamping device from the outside, and on the other hand a sealing with respect to an inner space of the housing or profile can be provided, the friction drive being arranged in said inner space. Additionally, the guide of the pressure bolt can be supported in the borehole by the sealing element.

Figure 2:
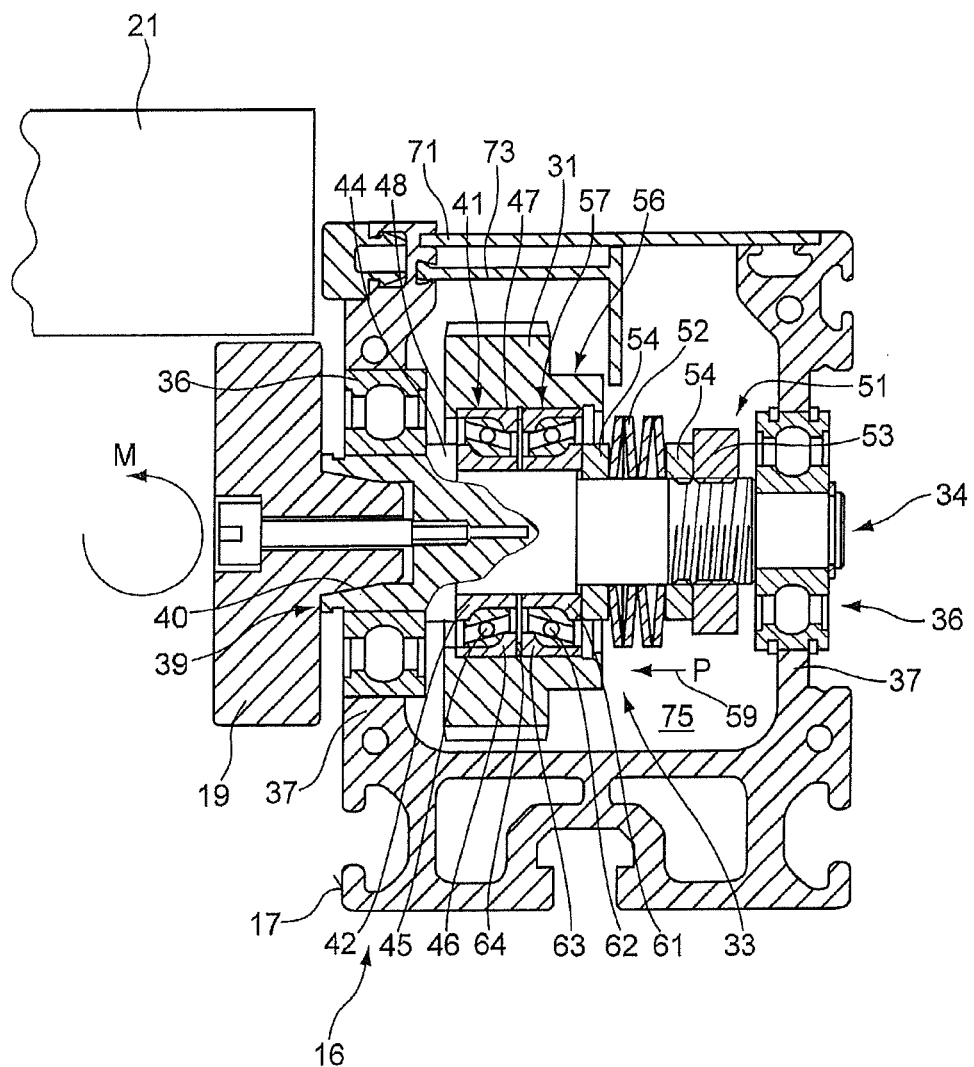
Figure 3:
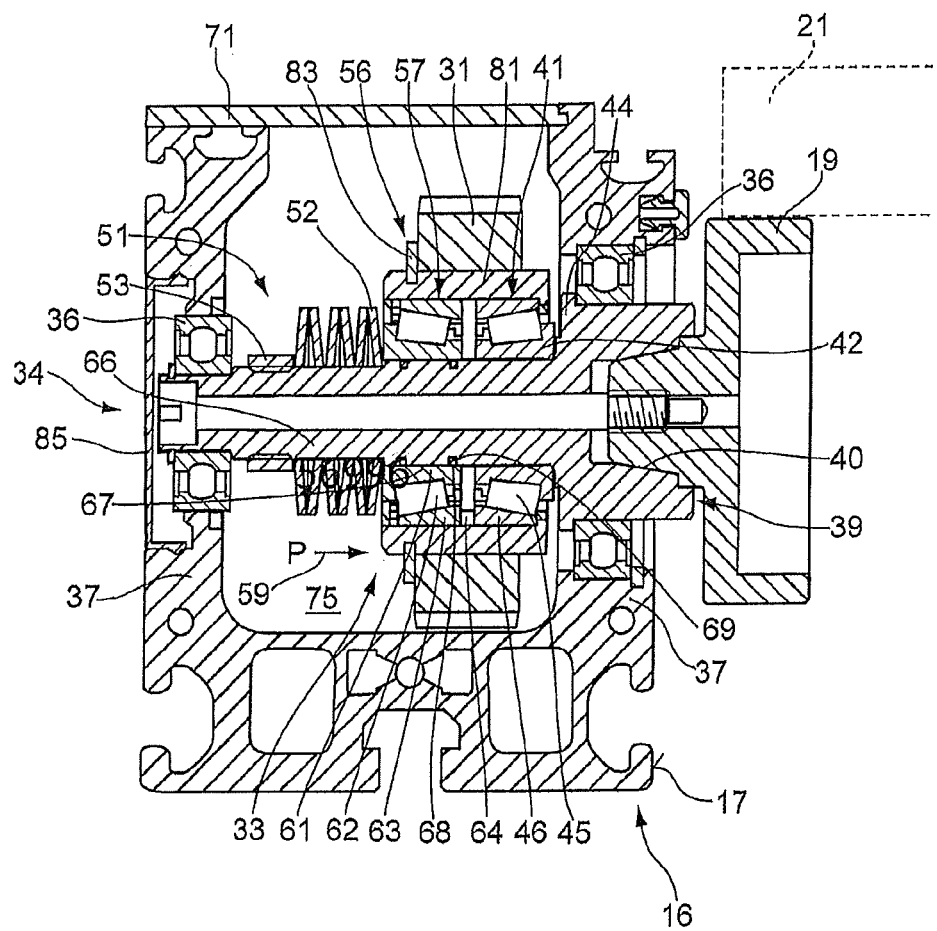
Figure 4:
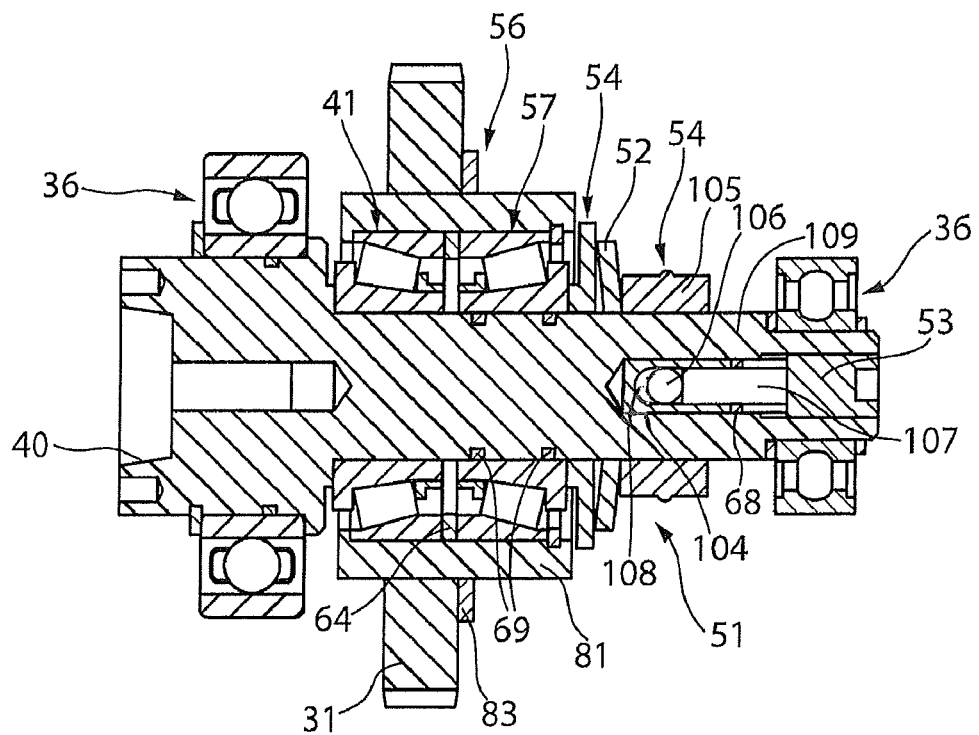
Figure 5:
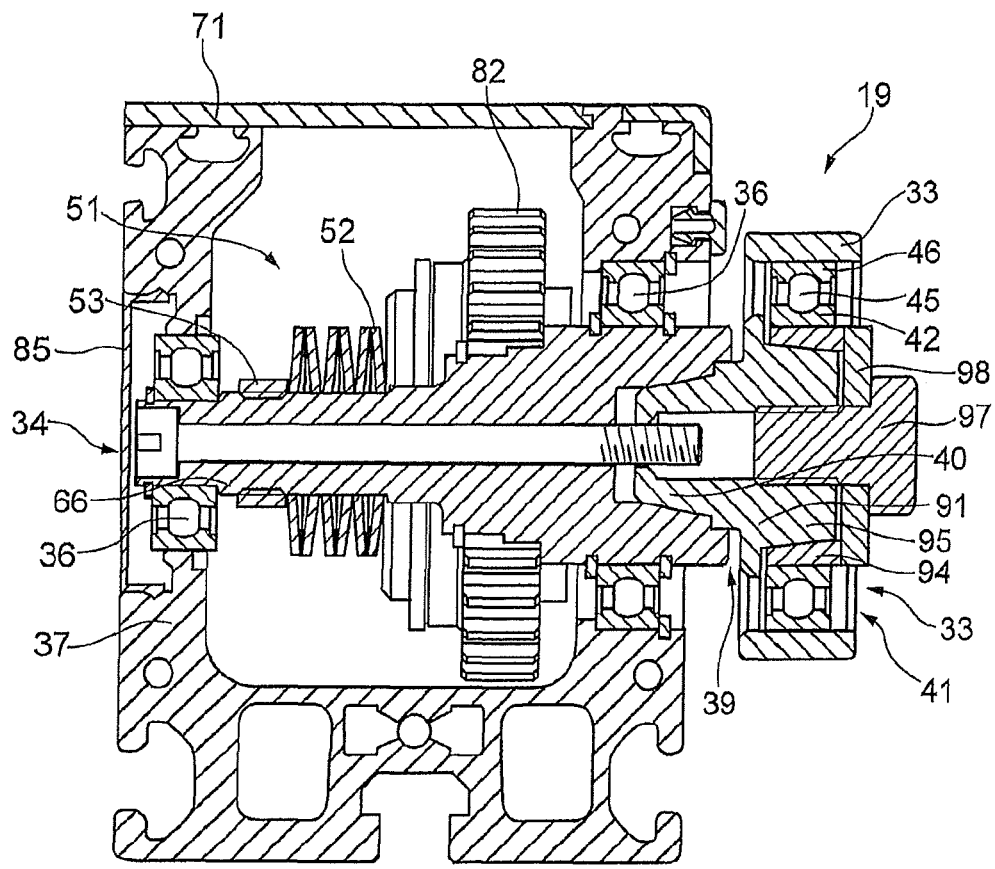
Figure 6:
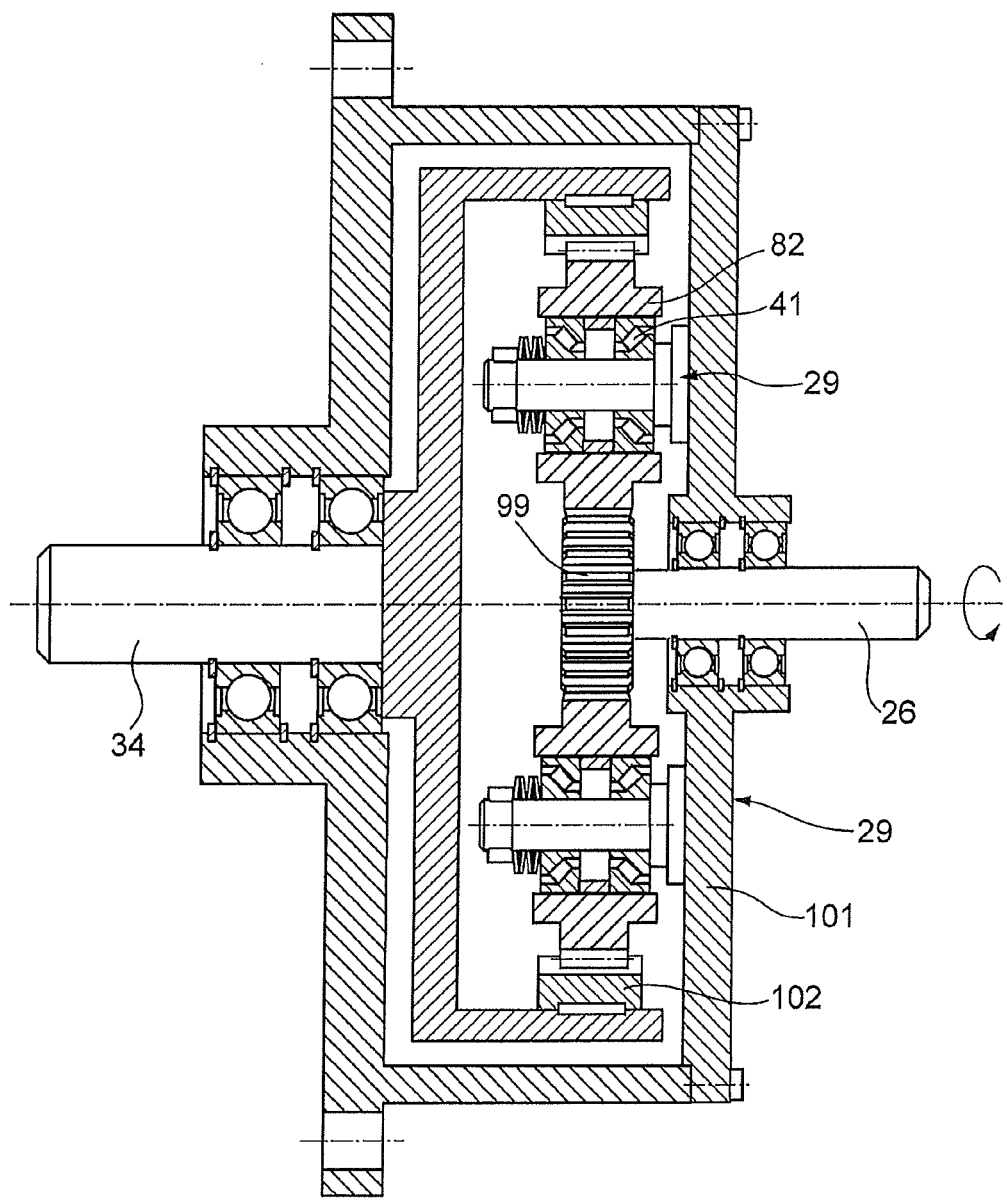

The invention as well as further advantageous embodiments and developments of the same are described and explained in more detail below by means of the examples depicted in the drawings. The features to be gleaned from the description and the drawings can be applied individually or together in any combination according to the invention. Herein are shown:

FIG. 1 a perspective view of a drive module of a transport conveying device having the friction drive according to the invention, FIG. 2 a schematic sectional view of the friction drive according to the invention according to FIG. 1, FIG. 3 a schematic sectional view of an alternative embodiment of the friction drive according to the invention according to FIG. 1, FIG. 4 a schematic sectional view of a further alternative embodiment of the friction drive according to FIG. 1, FIG. 5 a schematic sectional view of a further alternative embodiment of the friction drive according to the invention according to FIG. 1 and FIG. 6 a schematic sectional view of a further alternative embodiment of the friction drive according to the invention according to FIG. 1.

In FIG. 1, a drive module 11 of a transport conveying device is depicted perspectively, which can have further transfer modules and/or work stations as well as, if necessary, infiltration and ejection stations for the workpiece carrier(s) 21 or the workpiece. This drive module 11 comprises a base frame 14 on which two supporting frames 16 are arranged, aligned in parallel to each other. Such supporting frames 16 can be formed from drawn profiles, in particular aluminium profiles. Castors 19 are provided on each of the inner sides 17 of the supporting frame 16 which point towards one another, along which one or more workpiece carriers 21 are received displaceably. To move the workpiece carriers 21 in the transport direction 22, a drive 24 is provided in the drive module 11 which drives a drive shaft 26 via a gearing 25 which transmits a drive torque to friction drives 29 arranged one behind the other in the supporting frame 16 via an intermediate gear wheel 27 or drive gear wheel 27. Alternatively, the drive 24 can also drive an intermediate gear wheel 27 directly. An intermediate gear wheel 27 is arranged between each friction drive 29 such that all friction drives 29 arranged one behind the other, which each receive a castor 29, are connected to be driven directly to one another. Alternatively, instead of a drive gear wheel and intermediate gear wheel, other drive elements can also be provided which transmit drive torques using friction and/or form fit. The friction drives 29 are provided, in the exemplary embodiment according to FIG. 1, only in one of the two supporting frames 16. Alternatively, these can also be arranged in both supporting frames 16 such that the workpiece carrier 21 lying on the castors 19 is driven on both narrow sides.

In FIG. 2, a schematic sectional view along the line I-I according to FIG. 1 of the friction drive 29 is depicted. The friction drive comprises a drive element 31 which is driven by the intermediate gear wheel 27. The drive torque of the drive element 31 is transmitted by a torque-limiting device 33 to a drive element 34, which is mounted rotatably in side bolsters 37 of the supporting frame 16 by means of a bearing 36 respectively. The drive element 34 is preferably formed as a shaft, which has a receiving section 39 on a front-side end, on which the castor 19 is able to be arranged. Preferably, the receiving section 39 has a clamping cone 40 in order to transfer the rotational forces from the drive element 34 to the castor 19, on which the workpiece carrier 21 lies.

The torque-limiting device 33 comprises at least one rolling bearing 41 which is fixed to an inner race 42 to be fixed in terms of rotation on the drive element 34, and abuts on a shoulder 44. An outer race 46 of the rolling bearing 41 receives the drive element 31, the receiving section 47 of which is also limited by a shoulder 48 on which the outer race abuts. The rolling bearing 41 of the torque-limiting device 33 is preferably formed as a ball bearing or tapered roller bearing or similar.

For the setting of a transmission torque between the drive element 31 and the output element 34, a clamping device 51 is provided which preferably engages with the output element 34 and acts on an inner race 42 of the rolling bearing 41. A torsional isolation device 56 is provided for friction isolation between the clamping device 51 and the torque-limiting device 33, which is formed preferably as a rolling bearing 57. Thus, when applying an axial clamping force 59, i.e. an axial displacement of the outer race 46 towards the inner race 42 of the rolling bearing 41, a friction isolation can be provided by the rolling bearing 57 of the torsional isolation device 56. Thus, the transmission torque which is able to be set is determined by the at least one rolling bearing 41 of the torque-limiting device 33, provided the torsional isolation device 56 is formed by an axial roller bearing as a rolling bearing 57. Preferably, the rolling bearing 57 of the torsional isolation device 56 is formed to be structurally identical to the rolling bearing 41 of the torque-limiting device 33 and as a mirror image to this such that the torsional isolation device 56 has a double function, i.e. on the one hand assumes a torsional isolation between the clamping device 51 and the torque-limiting device 33, and on the other hand at the same time also contributes during the setting of the transmission torque between the drive element 31 and the output element 34.

The clamping device 51 has at least one spring element 52 which is preferably formed as a disk spring or a disk spring packet. Furthermore, an adjusting element 53 is provided, in particular an adjusting screw which engages with the output element 34. A pressure piece 54 is provided between the adjusting element 53 and the spring element 52 which is likewise arranged between the spring element 52 and an inner race 61 of the rolling bearing 57.

Due to the design of the torsional isolation device 56 having the additional function of the torque-limiting device 33, a spacer element 64 is arranged between the two rolling bearings 41 and 57. Thus the following process takes place for the setting of a transmission torque in order to achieve free running for a drive torque which exceeds the transmission torque:

An axial clamping force according to arrow 59 is generated by the clamping device 51 by means of the adjusting element 53. The inner race 61 of the rolling bearing 57 is loaded via the pressure piece 54. Due to the geometry of the inner race 41, a force acts in the axial direction 59 on the rolling body 62, which in turn transmits the force to the outer race 63 of the rolling bearing 57. Due to the spacer element 64, this axial force is transferred directly to the outer race 46 of the rolling bearing 41, whereby a clamping of the rolling body 45 to the inner race 42 of the rolling bearing 41 occurs. Thus, the outer races 63, 46 are clamped axially to the inner races 61, 42 of the rolling bearing 57, 41 to the same degree in order to set the transmission torque. The stronger the axial displacement of the outer races 46, 63 towards the inner races 61, 42, the greater the transmission torque, i.e. the later the free running is used.

The supporting frame 16 is preferably formed to be open upwardly and closed by a removable cover 71. Additionally, a further protective cover 73 is provided which extends along the supporting frame 16. This protective cover 73 covers the drive elements 31 and the intermediate gear wheels 27 to protect from damages, such that in the case of a lifted cover 71, an accessibility to the adjusting element 53 of the clamping device 51 is provided. Preferably, an oil or fat supply is provided in the lower region 75 of the supporting frame 16 in order to lubricate at least the drive elements 31 and, if necessary, also the rolling bearing 41, 57 as well as, if necessary, the bearings 36.

It is understood that the function of the drive element 31 and the output element 34 can also be provided in a reversed manner.

In FIG. 3, an alternative embodiment of the friction drive 29 according to the invention is depicted. The principal construction and the mode of action correspond to the friction drive depicted in detail in FIG. 2 such that with reference to the components and the naming thereof as well as the functionality thereof is referred to. Below, the optional differences are addressed which can also apply for the embodiment in FIG. 2.

For the improvement of the axial displaceability of the rolling bearing 57 of the torque-limiting device 37, preferably an annular gap 67 is formed between the inner race 61 of the rolling bearing 57 of the torque-limiting device 37 and a shaft section 66 of the output element 34. This can, for example, be created such that the shaft section 66 is produced with an undersize with respect to an inner diameter of the inner race 61. Preferably, two sealing elements 68 are arranged at a distance to each other in the annular gap 67 which engage with the inner race 61 of the rolling bearing 57 and form a closed annular gap 67. Preferably, circumferential grooves 69 are provided on the shaft section 66 into which the sealing elements 68 are inserted and are held in their position. An intermediate space or closed annular gap 67 resulting therefrom is preferably filled with a lubricant and/or a corrosive medium, in particular a fat. Thus the axial displaceability of the inner race 41 and thus of the rolling bearing 57 remain maintained with respect to the shaft section 66 even during the application of high clamping forces via the spring elements 52 and a defined positioning movement or axial displacement can be enabled without a clamping effect resulting between the inner race 61 and the output element 34, in particular the valve section 66. Additionally, the introduction of the lubricant and/or corrosive medium serves as a corrosion protection. This medium remains in the annular gap 67 due to the sealing elements 68.

In the exemplary embodiment according to FIG. 3, the rolling bearing 41, 57 is, for example, depicted as a tapered roller bearing. The drive element 31 is, for example, differently to FIG. 2, formed by a circumferential sleeve 81 which receives, for example, a gear wheel or other drive wheel 82 by means of a press fit or similar and forms the drive element 31. Furthermore, a stepped fit can be formed between the sleeve 81 and the gear wheel 82 and the positioning thereof with respect to each other can be secured by a securing element 83.

Furthermore, alternatively to FIG. 2, the clamping device 51, in particular the spring elements 52, can engage directly with a front-side of the inner race 61.

The same applies for the adjusting element 53 which can, for example, engage directly with the spring elements 52. The pressure pieces 54 can thus optionally be arranged or omitted.

Furthermore, an end of the output shaft 34 lying opposite the castor 19 is provided with a sealing cover 85 or a cap such that the bearing 36 which receives the output shaft 34 is likewise provided in a closed region which can be filled, for example, with a lubricant.

Furthermore, in this embodiment according to FIG. 3, alternatively the castor 19 is fixed to the output shaft 34 by an opposing side by means of a screw connection via a clamping cone, i.e. a clamping element extends completely within the output element 34. Thus a re-clamping which, if necessary, becomes required from outside, of the castor 19 to the drive element 34 can be subsequently enabled.

The principle of the friction drive 29 is likewise provided in this embodiment.

In FIG. 4, a further alternative embodiment of the friction drive 29 to FIG. 2 is depicted. This embodiment can also be an alternative embodiment to the exemplary embodiment according to FIG. 3, which is modified such that the castor 19 is mounted in an analogous manner to the embodiment according to FIG. 2 with respect to the output element 34, by the screw connection such that a complete penetration of the output element 34 by a fixing means such as is depicted in FIG. 3 is not required. This embodiment according to FIG. 4 comprises an isolation device 56 which corresponds in construction to the isolation device 56 depicted and described in FIG. 3 such that reference is made to this.

The clamping device 51 is formed to be different from the embodiment in FIG. 2 such that the adjusting element 53 is not formed as an adjusting screw or similar which engages with the outer periphery of the output element 34, but as an adjusting screw which engages in a front-side borehole 104 in the output element 34. This adjusting element 53 formed as an adjusting screw acts on a pressure piece 54 which consists of a pressure sleeve 105 which is guided by the outer periphery of the output element 34 and is moveable axially along the longitudinal axis of the output element 34. A drive pin 106 engages with the pressure sleeve 105, said drive pin 106 passing through a borehole 104 of the output element 34. The adjusting element 53 can engage directly with the drive pin 106. Preferably, a pressure bolt 107 is arranged lying therebetween such that a rotational movement of the adjusting screw with regard to the axial displacement movement is torsionally isolated via the pressure bolt 107. The drive pin 106 of the pressure piece 104 is guided into a slot-shaped recess 108 which is provided in a sleeve section 109 formed by the borehole 104 in the output element 34 and extends along the longitudinal axis of the output element 34. The pressure bolt 107 is preferably provided with a sealing element 68 which seals a gap between an outer periphery of the pressure bolt 107 and the borehole 104 such that, if necessary, a lubricant surrounding the isolation device 56 cannot reach outside the supporting frame 16.

In the case of an operation of the adjusting screw in the borehole, the drive pin 106 is moved in the direction of the isolation device 56 via the pressure bolt 107, such that the pressure sleeve 105 acts on the spring element 52 which is formed, for example, as a disk spring. The outer periphery of the spring element 52 preferably engages with a pressure piece 54 which is formed in such a way that, on the one side the spring element 52 formed as a disk spring can engage with the outer periphery thereof, and on the other side the axial clamping force acts on the inner race 42 of the rolling bearing 41.

Due to the slot-shaped recess 108, a movement limitation of the clamping device 51 can be provided. Thus, on the one hand a force limitation is provided if the drive pin 106 abuts on an end section of the slot-shaped recess which points towards the isolation device 56. On the other hand, at the same time, a maximum torque limitation of the friction drive 28 can also be provided.

In FIG. 5, a further alternative embodiment of the friction drive 29 according to the invention is depicted. The principal construction and the mode of action correspond to the friction drive 29 according to FIGS. 2 and 3 such that reference is made to FIG. 3 with regard to the arrangement and mounting of a drive shaft 34 in the base frame 14 and with regard to the receiving of the clamping device 51. The gear wheel 82 in this embodiment is positioned directly on the shaft section 66 of the drive shaft 34. Thus the drive force is transmitted to the output shaft 34 via the gear wheel 82 and from there to a castor 19 which is different from the previous exemplary embodiments and is described below in detail. This castor comprises a base body 91 which has a clamping cone 14 which is also known from FIG. 3. Between the base body 91 of the castor 19 and an outer periphery, via which the workpiece carrier 21 is driven, the castor comprises the torque-limiting device 33. This is, for example, formed as a rolling bearing 41 having an inner race 42 and an outer race 46 as well as a rolling body 45 arranged therebetween. This torque-limiting device at the same time also represents a torsional isolation device 56. In this embodiment, these two coincide. Alternatively, instead of a rolling bearing 41 two or three rolling bearings can also be arranged next to one another which, however, each fulfil the same function. This is, for example, a curling ball bearing.

The torque-limiting device furthermore comprises an outer clamping ring 93 as well as an inner clamping ring 94, between which the rolling bearing 41 is arranged. The clamping device 51 is formed to be different to the embodiment according to FIGS. 2 and 3 and enables the application of a radial clamping force via at least one clamping element 95. For this purpose, the clamping element 95 is formed as a tapered or clamping cone which is able to be set on the base body 91 of the castor 19 or advantageously is formed directly on the base body 91 as a sloping surface such that the inner clamping ring 94 engages therewith with a wedge-shaped outer peripheral surface and forms the tapered cone. The clamping element 95 or the inner clamping ring 94 is wedged over a positioning element 97 and a clamping disk 98, whereby a radial press connection is generated between the outer clamping ring 93 and the inner clamping ring 94. Thus the friction in the rolling bearing 41 is increased or is able to be set. Instead of a tapered cone, according to the exemplary embodiment, further devices to apply a radial clamping force for the generation of a radial clamping of the inner to the outer clamping ring 93, 94 can be used.

In FIG. 6, a further alternative embodiment of a friction drive 29 is depicted. Therein, several friction drives 29 are aligned next to each other and act simultaneously a frictional torque is able to be set between a drive shaft 26 and an output shaft 34. In this embodiment, friction drives according to FIG. 2 are used which are positioned with respect to one another according to the manner of a planetary gear. The drive shaft 26 receives a gear wheel 99 with which the gear wheel 82 of the friction drive 29 engages, wherein, for example, two friction drives 29 are arranged on a housing wall 101 in a stationary manner. The initial torque introduced via the drive shaft is transmitted via an outer gear wheel 102 which is connected to the output shaft 34, wherein the maximum drive torque is limited by the friction drives 29 due to the arrangement of the friction drives 29. Due to such an arrangement of several friction drives 29 with respect to each other, the maximum adjusting region of the frictional torque is enlarged. The embodiment depicted in FIG. 6 can also comprise friction drives according to FIG. 3.

All described features are each essential to the invention alone or in any combination.

The invention claimed is:

1. A friction drive for force transmission, having
a drive element,
an output element, and
a torque-limiting device acting between the drive element and output element, which torque-limiting device transmits a drive torque introduced by the drive element up to a transmission torque, which is set by means of the torque-limiting device, to the output element and generates free running for a drive torque which exceeds the set transmission torque, and which comprises at least one rolling bearing having an inner race and an outer race as well as rolling bodies arranged therebetween, as well as a clamping device that uses the inner race and the outer race of the at least one rolling bearing of the torque-limiting device that are displaceable towards one another in the axial direction or are clamped to each other in the radial direction for setting the transmission torque,
wherein a torsional isolation device is provided between the clamping device and the torque-limiting device and the torsional isolation device is formed as a rolling bearing;
wherein the rolling bearing of the torsional device is arranged to be axially displaceable by the clamping device with its inner ring; and
wherein an annular gap is provided between the inner race of the at least one rolling bearing of the torque-limiting device and a shaft section of the drive element, at least two sealing elements which are arranged at a distance to each other being arranged in said annular gap.

2. The friction drive according to claim 1, wherein the clamping device has at least one spring element and an adjusting element, by which the pre-tensioning force is set in the axial or radial direction on the inner race or outer race of the rolling bearing of the torque-limiting device.

3. The friction drive according to claim 2, wherein the clamping device is arranged on or in the output element and the adjusting element engages with or in the output element in the axial direction of the output element.

4. The friction drive according to claim 1, wherein the at least one rolling bearing of the torque limiting device having the inner race fixed in terms of rotation on the output element and abutting a shoulder of the output element and the rolling bearing of the torque-limiting device abuts on a shoulder of the drive element with its outer race.

5. The friction drive according to claim 1, wherein the rolling bearing of the torque-limiting device and torsional isolation device are formed as a contact ball bearing, as a radially pre-tensioned ball bearing, as a roller bearing or tapered roller bearing, which are arranged to be adjacent to each other and a mirror image of each other.

6. The friction drive according to claim 1, wherein the drive element is formed as a drive gear wheel which is driven by an intermediate gear wheel or a drive.

7. The friction drive according to claim 1, comprising further friction drives in a supporting frame of a transport conveying device and an intermediate wheel is arranged between each friction drive.

8. The friction device according to claim 1, wherein the at least one sealing element is arranged in a circumferential groove of the shaft section and protrudes slightly with respect to the outer periphery of the shaft section.

9. The friction drive according to claim 1, wherein a lubricant or corrosive medium or both are provided in the annular gap limited by the sealing elements.

10. The friction drive according to claim 1, wherein the clamping device is formed by an outer and an inner clamping ring, between which the at least one rolling bearing of the torque-limiting device is able to be positioned and at least one clamping element engages with the outer or inner clamping ring, which generates a radial clamping between the inner and outer clamping ring and the at least one clamping element is formed as a tapered or clamping cone or having an interference fit.

11. A friction drive for force transmission, having
a drive element,
an output element, and
a torque-limiting device acting between the drive element and output element, which torque-limiting device transmits a drive torque introduced by the drive element up to a transmission torque, which is set by means of the torque-limiting device, to the output element and generates free running for a drive torque which exceeds the set transmission torque, and which comprises at least one rolling bearing having an inner race and an outer race as well as rolling bodies arranged therebetween, as well as a clamping device that uses the inner race and the outer race of the at least one rolling bearing of the torque-limiting device that are displaceable towards one another in the axial direction or are clamped to each other in the radial direction for setting the transmission torque,
wherein several torque-limiting devices which are aligned next to each other are provided, in the form of a planetary gear.

12. A friction drive for force transmission, having
a drive element,
an output element, and
a torque-limiting device acting between the drive element and output element, which torque-limiting device transmits a drive torque introduced by the drive element up to a transmission torque, which is set by means of the torque-limiting device, to the output element and generates free running for a drive torque which exceeds the set transmission torque, and which comprises at least one rolling bearing having an inner race and an outer race as well as rolling bodies arranged therebetween, as well as a clamping device that uses the inner race and the outer race of the at least one rolling bearing of the torque-limiting device that are displaceable towards one another in the axial direction or are clamped to each other in the radial direction for setting the transmission torque, wherein a torsional isolation device is provided between the clamping device and the torque-limiting device and the torsional isolation device is formed as a rolling bearing; and wherein there is provided an adjusting element, by which the pre-tensioning force is set in the axial or radial direction on the inner race or outer race of the rolling bearing of the torque-limiting device, and wherein the adjusting element is formed as an adjusting screw which is arranged in a front-side borehole of the output element and a pressure piece formed as a pressure sleeve having a drive pin operates displaceably in the axial direction.

13. The friction drive according to claim 12, wherein a pressure bolt is provided between the drive pin and the adjusting screw.

14. The friction drive according to claim 13, wherein the adjusting screw has a sealing element and seals a guiding gap between the borehole and the pressure bolt.

* * * * *